Dec. 2, 1969    J. M. CRAVEN ET AL    3,481,767
PROCESS FOR APPLYING A POLYURETHANE FINISH
COMPOSITION TO SYNTHETIC MICROPOROUS
POLYMERIC MATERIALS
Filed Dec. 29, 1966

INVENTORS
JAMES M. CRAVEN
JOHN I. DYE
JEROME HOCHBERG

BY *Hilmar S. Fricke*

AGENT

United States Patent Office 3,481,767
Patented Dec. 2, 1969

3,481,767
PROCESS FOR APPLYING A POLYURETHANE FINISH COMPOSITION TO SYNTHETIC MICROPOROUS POLYMERIC MATERIALS
James M. Craven, Wilmington, Del., John I. Dye, West Chester, Pa., and Jerome Hochberg, Nashville, Tenn., assignors to E. I. du Pont de Nemours and Company, Wilmington, Del., a corporation of Delaware
Continuation-in-part of application Ser. No. 520,076, Jan. 12, 1966. This application Dec. 29, 1966, Ser. No. 605,203
Int. Cl. B44d 1/09, 1/14
U.S. Cl. 117—76   15 Claims

ABSTRACT OF THE DISCLOSURE

A process for applying a polyurethane finish to a synthetic microporous fiber reinforced chain-extended polyurethane sheet material by applying a solution of a polyurethane to the microporous sheet material wherein the polyurethane consists essentially of the reaction product of a bis-haloformate of a polyalkyleneether glycol and an organic diisocyanate which is dissolved in a particular solvent mixture that will not adversely affect the microporous sheet material; the sheet is dried after it is coated with polyurethane solution.

---

Figure 1:
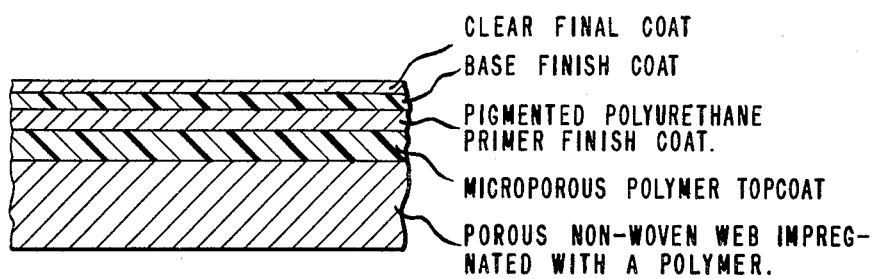

This application is a continuation-in-part of the copending application Ser. No. 520,076, filed Jan. 12, 1966.

This invention concerns a process for applying a finish composition to synthetic microporous polymeric sheet materials. In particular, this invention relates to a process for applying a finish composition of a solution of a polyurethane polymer to a synthetic microporous polyurethane coriaceous sheet material without adversely affecting the microporous structure of the material.

Microporous polyurethane coriaceous sheet materials are primarily used as leather replacements in both men's and women's shoes, handbags, luggage, and the like. Many prior art finish compositions break down under ordinary use, by microcracking, checking and flaking of the coating, particularly, when the microporous material is used as the upper for shoes. Obviously, this adversely affects the appearance of articles made from these microporous materials, such as shoes, and necessitates that these articles be frequently polished and buffed.

Another unexpected problem arises because of microcracking and checking of prior art finishes on the microporous polyurethane material used for shoe uppers. Residual salts from either the leather sole or from the wearer wick into the microporous polyurethane upper of the shoe and exude out through the microcracks and checks of the finish, giving the shoes a dull white milky appearance. These salt deposits are not easily removed by simple buffing but require washing and polishing of the shoe.

A polyurethane polymer finish composition can be applied to alleviate these aforementioned problems. However, a problem arises when the polyurethane polymer finish composition is applied to the microporous polyurethane sheet material. The solvents used in the finish composition tend to soften and collapse the microporous polymeric structure of the sheet, thereby rendering it impermeable or substantially impermeable and making the material useless as a leather replacement in shoes.

By using the novel coating process of this invention, these aforementioned problems do not occur since the solvents used for the polyurethane finish composition do not adversely affect the microporous polymeric structure of the sheet material and a product result that has a high water vapor permeability and the finish has an excellent resistance to scuffing, cracking, checking and flaking.

The novel process of this invention is concerned with the application of a polyurethane polymeric finish composition to a synthetic microporous fiber reinforced sheet material of a chain-extended polyurethane polymer. In the first step of the process, a layer of a finish which is a solution of a polyurethane polymer and a solvent for the polymer is applied to the microporous sheet. The polyurethane polymer of the finish composition is the reaction product of a bis-haloformate of a polyalkyleneether glycol having a molecular weight of over 400 and a bis-haloformate of a glycol having a molecular weight below 400 with an organic diamine.

The solvent used in the finish composition is substantially inert to the microporous sheet material, i.e., the solvent does not adversely affect the physical properties of the sheet by softening the chain-extended polyurethane polymer or collapsing the microporous structure of the sheet nor does it adversely affect the appearance of the sheet. A solvent from one of the following groups is used to form the finish:

(1) A mixture of an aromatic solvent and a hydroxyl terminated organic solvent from the group consisting of a $C_1$–$C_6$ saturated aliphatic monohydric alcohol and a glycol monoalkylether wherein the alkyl group is $C_1$–$C_4$;

(2) An aralkyl alcohol; and (3) A halogenated organic liquid having a solubility parameter of 9.1–10.7.

In the second step of the process, after the microporous sheet is coated with the finish composition, the coated sheet is dried preferably at an elevated temperature of about 90–115° C.

Preferably, the polyurethane finish composition has about a 0.1–10% by weight polymer solids content and more preferably the polymer solids content is about 3–7% by weight. The polyurethane finish composition can be applied to the microporous substrate by any of the well-known methods in the process of this invention, for example, by spraying, roller coating, dipping, swabbing, brushing, or padding; dip coating is one preferred method.

The amount of finish composition (dry weight basis) applied by the process of this invention is about 0.1–5.0 oz./square yard and preferably about 0.1–2 oz./square yard and more preferably 0.2–0.5 oz./square yard. The thickness of the polyurethane finish composition, after it is dried and in firm adherence to the microporous sheet, is about 0.1–5 mils preferably 0.1–2 mils but more preferably, the dried finish is about 0.2–0.5 mil thick. When the microporous material is to be used as a leather replacement in shoes, it is often preferable to apply the finish composition in two separate layers; the first layer of finish composition contains a large amount of pigment, such as titanium dioxide, for hiding defects on the surface of the microporous sheet material and the second layer of finish composition contains the desired pigments to provide the necessary color for the material, or this second coat may be clear if the first coat gives the substrate the desired color. Preferably, a final coat is applied to the microporous sheet, such as cellulose acetate butyrate, to provide a glossy surface.

The preferred embodiments of sheet materials resulting from the process of this invention can readily be understood by reference to the following drawings:

FIGURE 1 illustrates a cross-section of a microporous sheet material that has been coated by the process of this invention. One preferred microporous sheet material, as illustrated in FIGURE 1, comprises a porous substrate of a non-woven web that is impregnated with a polymeric material and that has a microporous chain-extended polyurethane topcoat about 10–30 mils thick. A primer finish coat is applied to this microporous sheet material, which has a thickness of about 0.1–5 mils when dry, by the process of this invention. This primer finish is a pigmented polyurethane coating containing pigment in about 10–50% by volume concentration, such as titanium dioxide, to hide the surface defects of the microporous sheet material. A base finish coat is then applied by the process of this invention which is about 0.1–1 mil thick which is clear or colored by dyes or pigments depending on the color desired in the final product. A clear final coat is then applied, such as cellulose acetate butyrate, to provide a glossy surface.

To increase the scuff and abrasion resistance of the coating 0.5–10% by weight, based on the weight of total polymer, of a silicone resin is added to the polyurethane primer finish coat composition. The silicone resin may be added to both the primer and to the base finish coats. Preferably, the silicone resin is only added to the primer finish coat.

Figure 2:
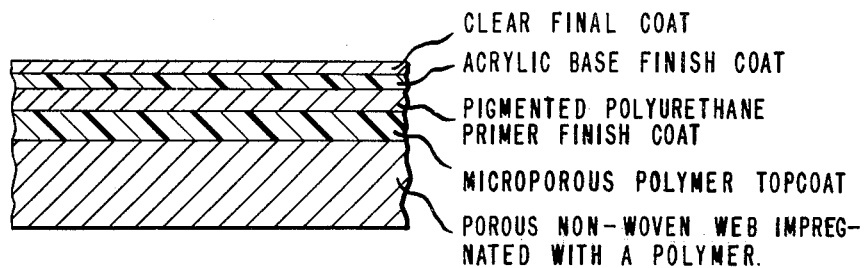

FIGURE 2 illustrates another preferred embodiment of this invention. A pigmented acrylic base finish coat is applied over a polyurethane primer finish coat which has been applied by the process of this invention. The acrylic base finish coat provides increased scuff and abrasion resistance and forms a very durable product useful in the manufacture of shoes. A clear final coat is applied, such as cellulose acetate butyrate, to provide a glossy surface.

To form the polyurethane polymer useful in the process of this invention, an organic diamine is reacted at a moderate temperature with the bis-haloformates of a glycol and of a polyalkyleneether glycol. Typical polyurethanes and a process for forming these polyurethanes useful in this invention are in Katz, U.S. Patent 2,929,802, issued Mar. 22, 1960.

The diamines used to prepare the above polymers used in this invention may be primary or secondary, aliphatic, alicyclic, heterocyclic or aromatic diamines; for example, ethylene diamine, hexamethylene diamine, piperazine, 2,5-dimethyl piperazine, p-phenylene diamine and others with piperazine being a preferred diamine.

The bis-haloformates of the glycols and the polyether glycols used to form the polyurethane polymer used in the process of this invention may be chloro, bromo, iodo or fluoro formates but the bis-chloroformates are preferred since they are readily formed by a reaction of the glycol or polyglycol with phosgene. Typical bis-chloroformates of the following glycols having a molecular weight below 400 used for forming these polyurethane polymers are as follows: ethylene glycol, propylene glycol, 1,4-butane diol, cyclohexane diol, etc., with 1,4-butane diol being preferred.

The following bis-chloroformates of polyalkyleneether glycols having a molecular weight over 400 and preferably having a molecular weight from about 1000–2500 are used in forming the above polyurethanes: polyethyleneether glycol, polypropyleneether glycol, polytetramethyleneether glycol and polydecamethyleneether glycol, with the preferred being polytetramethyleneether glycol.

One preferred polyurethane polymer used in this invention is the reaction product of piperazine and the bis-chloroformates of polytetramethyleneether glycol having a molecular weight of 1000–2000 and the bis-chloroformate of 1,4-butane diol.

To increase the abrasion resistance of the dried finish composition on the microporous substrate, polyvinyl butyral is added to the coating composition in amounts up to 50% by weight of total polymer solids. One preferred coating composition contains 10 parts by weight polyurethane polymer, 5 parts by weight polyvinyl butyral polymer and 2 parts by weight pigment.

Also, to further increase abrasion and scuff resistance, a silicone resin is added to the polyurethane finish composition used in this invention. About 0.1–10% by weight, and preferably 1–5% by weight, of total polymer solids, of the silicone resin is added to the finish composition. One preferred silicone resin is dimethyl polysiloxane that has a viscosity of over 1000 centipoises; for example, Dow Corning Silicone C–4–2009, which is a dimethyl polysiloxane and has a viscosity of about 1200 centipoises, and Dow Corning DC–200 silicone fluid, which has a viscosity of about 100,000 centipoises.

The primary requirement for the solvent used for the finish composition is that it does not materially attack and degrade the microporous polyurethane polymer of the sheet material thereby causing complete collapse of the microporous structure or substantially reducing the water vapor permeability of the sheet. Therefore, the solvent must selectively dissolve the polyurethane polymer used for the finish but must be substantially inert to the microporous substrate.

One useful group of solvents are mixtures of a 20–80% by volume aromatic solvent and of an 80–20% by volume hydroxy terminated solvent which is either a $C_1$–$C_6$ saturated aliphatic alcohol, preferably a $C_1$–$C_4$ saturated aliphatic alcohol, or a glycol monoalkylether in which the alkyl group is $C_1$–$C_4$. Typical useful blends of these solvents are: toluene/ethanol, benzene/methanol, toluene/isopropyl alcohol, benzene/t-butyl alcohol, xylene/n-butyl alcohol, xylene/methyl Cellosolve, xylene/Cellosolve, benzene/methyl isobutyl carbinol and xylene/butyl Cellosolve.

Another group of organic solvents useful in this invention are aralkyl alcohols of the general formula Ar—$(CH_2)_n$OH where $n$ is from 1 to 4 and Ar is a monovalent aromatic radical. Typical solvents of this type are: benzyl alcohol, 2-phenylethanol, 3-phenylpropanol, and 4-phenylbutanol.

A third group of solvents useful in this invention includes a variety of halogenated organic solvents that have a solubility parameter of 9.1–10.7. The solubility parameter of a solvent is an empirical number which indicates its solvency that is either calculated or determined experimentally. Halogenated organic solvents within the above range dissolve the polyurethane polymer used in the finish composition of this invention without adversely affecting the microporous sheet material. A full discussion of solubility parameters of solvents and determination of these parameters for a wide variety of solvents is in an article by Harry Burrell, Solubility Parameters for Film-Formers, in the Official Digest of the Federation of the Societies of Paint Technology, pp. 726–758, dated October 1955, which is hereby incorporated by reference. Typical useful solvents of this type are: methylene chloride, dibromomethane, dichloromethane, trichloromethane, dichlorobenzene, chlorobenzene, and the like, with one preferred being dichloromethane. These halogenated organic solvents can be used in combination with any of the aforementioned solvents to form useful finish compositions, for example, methylene chloride/carbitol, methylene chloride/n-butanol, methylene chloride/ethanol, dibromomethane/n-butanol and the like.

A variety of pigments, extender pigments and dyes can be added to the finish composition used in the process of this invention to give the desired color to the substrate. About 10–50% by volume pigment and preferably 15–25% by volume pigment can be used. Typically useful pigments are, for example, metal oxides, such as titanium dioxide, metal hydroxides, chromates, silicates, sulfides, sulfates, carbonates, carbon blacks, organic dyes, such as β-copper phthalocyanine, flakes and metal flake pigments.

To increase scuff and abrasion resistance of the microporous material having a polyurethane finish thereon formed by the process of this invention, a coating of an acrylic polymer dispersion is applied over the polyurethane finish and dried. A final coat such as cellulose acetate butyrate is then applied to give the resulting product a glossy surface.

The aqueous acrylic polymer dispersion which is used as a base finish coat on the material formed by the process of this invention has a pH of about 7–10, a polymer solids content of about 10–50% by weight, preferably 20–40% by weight, and contains pigment in a pigment volume concentration of up to 50% by volume. Preferably, the acrylic polymer used in the dispersion is a terpolymer of about 1–6% by weight of units of an α,β-unsaturated monovinylidene carboxylic acid, e.g., acrylic acid or methacrylic acid, units of a methacrylic acid ester and units of an acrylic acid ester. These esters should be of a $C_1$–$C_{12}$ saturated aliphatic monohydric primary alcohol. Preferred acrylic polymer compositions are, for example, ethyl acrylate/methyl methacrylate/methacrylic acid, and methyl methacrylate/2-ethylhexyl acrylate/methacrylic acid. To have the required strength and flexibility required for a shoe upper material, the acrylic polymer should have a tensile strength of at least 500 pounds per square inch and an elongation at break of at least 300%.

To increase the adhesion of the aforementioned acrylic polymer, the carboxyl groups of the polymer are reacted at about 35–70° C. with an alkylene imine of the formula

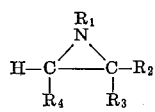

wherein $R_1$, $R_2$, $R_3$ and $R_4$ are either hydrogen or a $C_1$–$C_5$ alkyl radical. Preferred alkylene imines useful in this invention are ethylenimine and propylenimine. For the imination reaction to be effective, the resulting iminated polymer should have a nitrogen content of about 0.05–1% by weight.

One preferred acrylic dispersion is formed from a blend of two acrylic polymers. The blend consists of 25–35% by weight of a methyl methacrylate/ethyl acrylate polymer and 75–65% by weight of a methyl methacrylate/ethyl acrylate/methacrylic acid polymer that has been reacted with sufficient propylenimine to provide the polymer with about 0.01–0.5% by weight nitrogen.

One process for making a microporous polyurethane sheet material used in the process of this invention is disclosed in U.S. Patent 3,100,721 to E. K. Holden.

The polyurethane polymer of the above microporous sheet material is a chain-extended polymer that has a molecular weight of about 5000–300,000, which is formed by reacting an organic disocyanate with an active hydrogen containing polymeric material which is either a polyalkyleneether glycol or a hydroxyl terminated polyester. The isocyanate terminated polyurethane prepolymer that is formed is chain-extended with a compound that has at least two amino nitrogen atoms and each of the amino nitrogen atoms has at least one reactive hydrogen atom attached thereto. The polymer used in the microporous sheet material is a polyurethane either alone or in a mixture with other polymers, such as a vinyl chloride polymer.

These polyurethanes that are useful for preparing a microporous sheet material that is used in this invention are polyureas, that is, polyurethanes containing the recurring structural unit:

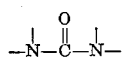

The prepolymers for these polyurethanes are prepared by mixing one or more polyalkyleneether glycols or hydroxyl-terminated polyesters with a molar excess of organic diisocyanate and heating the mixture to a temperature of about 50–100° C. to form a prepolymer having terminal —NCO groups. An alternate procedure is to react the diisocyanate with a molar excess of polyalkyleneether glycol or polyester, then cap the resulting product, that is, react it with more disocyanate to form a prepolymer having terminal —NCO groups.

The preferred polyurethanes for forming the microporous sheet material are the chain-extended polyurea type which are formed from aliphatic polyol segments which include the polyalkyleneether glycols having $C_3$–$C_{12}$ alkylene glycol. Polyalkyleneether glycols are the preferred active hydrogen containing material for the prepolymer formation. The most useful polyglycols have a molecular weight of 300 to 5000, preferably 400 to 2000; some of these polyglycols are, for example, polyethyleneether glycol, polypropyleneether glycol, polytetramethyleneether glycol, polyhexamethyleneether glycol, polydecamethyleneether glycol, polydodecamethyleneether glycol, and mixtures thereof. Polyglycols containing several different radicals in the molecular chain, such as the compound $HO(CH_2OC_2H_4O)_nH$ wherein $n$ is an integer greater than 1 can also be used.

The preferred polyurethanes for forming the microporous sheet material are prepared with at least a major portion of an aromatic, aliphatic or cycloaliphatic diisocyanates or mixtures thereof; for example, tolylene-2,4-diisocyanate, tolylene-2,6-diisocyanate, m-phenylene diisocyanate, biphenylene-4,4'-diisocyanate, methylene bis-(4-phenyl isocyanate), 4-chloro - 1,3-phenylene diisocyanate, naphthalene-1,5-diisocyanate, tetramethylene-1,4-diisocyanate, hexamethylene - 1,6-diisocyanate, decamethylene-1, 10-diisocyanate, cyclohexylene - 1,4-diisocyanate, methylene bis-(4-cyclohexyl isocyanate) and tetrahydronaphthalene diisocyanate. Arylene diisocyanates in which the isocyanate groups are attached to an aromatic ring are preferred since these isocyanates react more readily than do alkylene diisocyanates.

Polyesters can be used instead of or in conjunction with the aforementioned polyalkyleneether glycols, particularly those formed by reacting acids, esters or acid halides with glycols. Suitable glycols are polyalkylene glycols, such as methylene-, ethylene-, propylene-, tetramethylene-, decamethylene glycol; substituted polyalkylene glycols, such as 2,2-dimethyl-1,3-propanediol; cyclic glycols, such as cyclohexanediol and aromatic glycols, such as xylene glycol. Aliphatic glycols are generally preferred when maximum product flexibility is desired as when making microporous articles. These glycols are reacted with aliphatic, cycloaliphatic or aromatic dicarboxylic acids or lower alkyl esters or ester forming derivatives to produce relatively low molecular weight polymers, preferably having a melting point of less than about 70° C., and molecular weights like those indicated for the polyalkyleneether glycols. Acids for preparing such polyesters are succinic, adipic, suberic, sebacic, terephthalic and hexahydroterephthalic acids and the alkyl and halogen substituted derivatives of the acids.

Hydrazine is preferred as the chain-extending agent for the preferred polyurethane used to form the microporous sheet material, although $C_1$–$C_6$ (including cycloaliphatic) diamines, such as ethylene diamine, hexamethylene diamine and dimethyl piperazine and 1,4-diamino/piperazine can also be used advantageously either alone or in a mixture with hydrazine.

Another preferred chain-extender which is reacted with the isocyanates terminated prepolymer is a triamine which has the structural formula

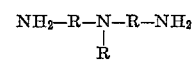

wherein R is an alkyl group containing 1–4 carbon atoms (i.e., a methyl ethyl, propyl or butyl group). In the preferred compound, the R beneath the central N is methyl and the other two R's are propyl; thus, the preferred compounds is N-methylamino-bis-propylamine.

The chain-extender need not consists entirely of the aforementioned triamine. It is usually best to use a blend of a minor proportion, preferably about 5–30 mole percent, of the above triamine chain-extender with a major proportion, about 95–70 mole percent, of another compound having two active hydrogen atoms bonded to amino-nitrogen atoms, preferably hydrazine. Other chain-extending compounds which can be used along with the preferred triamine are monosubstituted hydrazines, dimethyl - piperazine, 4 - methyl - m - phenylene - diamine, m - phenylene - diamine, 4,4' - diaminodiphenyl - methane, 1,4 - diamino - piperazines, ethylene diamine and mixtures thereof. A particularly preferred chain-extender is a mixture of about 80 mole percent hydrazine and 20 mole percent N-methyl-amino-bis-propylamine.

Mixtures of at least one vinyl polymer with a polyurethane can be used to prepare the microporous sheet material. Such mixtures, preferably containing polyvinyl chloride as the vinyl polymer, can contain from 1 to 2% of vinyl chloride polymer to about 50% thereof. Preferably, such mixtures contain at least about 50% by weight of the polyurethane.

Preferably, microporous polyurethane sheet materials used as a leather replacement have a topcoat of the aforementioned polymer and a porous fibrous substrate to give the material the rigidity and strength required for this use. Such substrates are, for example, woven, twills, drills and ducks; jersey, tricot and knitted materials; felts and needle punched batts; preferably, porous batts impregnated with synthetic resins, such as styrene/butadiene, acrylic, vinyl halide, and polyurethane polymers are used. The choice of the particular fibers from which the substrate is made is not critical; they include those made from polyamides, polyesters, polyesteramides, acrylic polymers, viscose rayon, wool, cotton, glass and mixtures thereof. Elastomeric fibers and elastic fibers can be also used. Porous non-woven, needle punched, heat shrunk batts of polyethylene terephthalate fibers impregnated with one or more of the aforementioned polyurethane polymers are particularly preferred. The preferred microporous sheet material contains about 30–60% fiber by weight and about 70–40% of a microporous polyurethane polymer.

The examples which follow illustrate the invention. All quantities are on a weight basis unless otherwise indicated.

EXAMPLE 1

Polyurethane polymer A is prepared by reacting 1.0 mole of the bis-chloroformate of polytetramethyleneether glycol molecular weight 1750, 4.0 moles of the bis-chloroformate of 1,4-butane diol with 4.2 moles piperazine. After the polymer is formed, a small amount of a stabilizer of 4,4-butylidene bis-(6-tertiary-butyl-m-cresol) is added.

The physical properties of Polymer A are determined by casting a film from a 5% polymer solids solution in which the solvent is a mixture of toluene and ethanol. The film is baked at 100° C. for ½ hour and then placed in a press under 100 p.s.i. pressure and 150° C. temperature for about 1 minute which gives the film a uniform thickness of about 1 mil. The physical properties are then determined for the polymer from the above prepared film and are as follows: water vapor permeability of 3500 gr./hr./100 m.$^2$ for a 1 mil thick film, tensile strength of 3000 p.s.i. and an elongation of 775% at break.

Finish composition 1 is formed by blending the following ingredients:

| | Parts by weight |
|---|---|
| Polyurethane polymer A | 5.0 |
| Carbon black pigment | 0.5 |
| Toluene/ethanol solvent (50:50 mixture) | 94.5 |
| Total | 100.0 |

A roll of microporous polyurethane sheet material about 42 inches wide is made in accordance with the teachings in Example 1 of U.S. Patent 3,100,721 to E. K. Holden, issued Feb. 21, 1961. The resulting product is a porous impregnated non-woven mat of 0.5 denier heat shrunk polyethylene terephthalate fibers impregnated with a microporous polyurethane polymer and is uniformly coated on one side with about 20 mils of a microporous polyurethane polymer which has water vapor permeability value of 5000 grams/hour/100 m.$^2$.

The above prepared microporous polyurethane sheet material is dip coated with finish composition 1 applying about 6.0 oz./square yard. The coated sheet is dried at about 100° C. and a clear final coat of cellulose acetate butyrate is then sprayed on top of the finish. This final coat is dried at about 100° C. to give a clear cellulose acetate butyrate coat having a dry weight of about 0.03 oz./square yard. The sheet material is then embossed according to the process described in U.S. Patent 3,157,723 to J. Hochberg, issued Nov. 17, 1964, with about 10 p.s.i. pressure and at a temperature of about 150° C. This embossing process gives the sheet material an excellent leather-like appearance.

This finished microporous polyurethane sheet material is subjected to the following tests and the results of the tests are recorded in Table I.

Bally Flexometer test

The Bally Flexometer provides a rolling, folding type of action in which a metal finger pushes into the sample from the back while the sample is rocked up and down. The samples are inspected after 40,000 flexes. Appearance of cracks in the finish and also failure of actual finish by flaking, generally around the area where the metal finger is pushed into the material, is recorded.

Permeability value determinations

Permeability value of the finished microporous polyurethane sheet material is determined by sealing the sheet on the top of a cup containing $CaCl_2$ and by determining the weight increase of $CaCl_2$ due to moisture pickup in the cup. The cup is stored at 90% R.H. in a constant temperature room at 72° F. for a two-hour period. The permeability value of the sheet is then calculated in grams of water per hour per 100 square meters of material. (This is the same test used to determine the permeability of the polymeric film and of the microporous sheet material before it is coated with finish Composition 1.)

Cold cracking test

The finished sheet material is subjected to a −20° F. temperature and while the sheet is at this temperature, the sheet is folded 180 degrees with the finished surface being the outer side of the sheet after it is folded. The sheet is then returned to a straight or flat position and the finish is examined for micro cracks and breaks. This test applies a severe tensile stress to the finish while it is under a low temperature.

Edgewear tests

*Wet abrasion test.*—This test abrades the surface of the finished microporous polyurethane sheet material while in a wet condition. Prior to testing, the samples are soaked one hour in water. A sample is fastened onto a half-round cylinder having a diameter of about two inches and weighing approximately four pounds. The cylinder is pushed back and forth across a Wellington-Sears No. 10 duck cloth. Under these conditions, the sample is subjected to about a two-pound load per linear inch. After fifty strokes, the samples are examined for abrasion of the surface of the finish.

*Dry abrasion test.*—Same as the wet abrasion test, except the sample is not soaked in water before testing.

In general, the aforementioned tests illustrate that a microporous polyurethane sheet material finished by the process of this invention forms a sheet in which the finish has excellent flex, crack and abrasion resistance even under severe test conditions such as low temperatures of −20° F. Also, the solvents used to form the finish are inert to the polymer of the substrate since no degradation of appearance or of the physical properties of the microporous sheet material is noted but the sheet remains microporous after it is finished which is necessary when the material is used as a leather-replacement, particularly in shoes.

EXAMPLE 2

Polyurethane Polymer B is prepared using the identical ingredients as in Example 1, except that the resulting polymer is stabilized with 2,2′-methylene-bis-(4-methyl-6-tertiary-butylphenol) in place of the stabilizer used in Example 1.

Finish Composition 2 is formed by blending the following ingredients:

| | Parts by weight |
|---|---|
| Polyurethane Polymer B | 4 |
| Polyvinyl butyral (molecular weight 38,000–45,000, hydroxyl content expressed as polyvinyl alcohol 20% by weight, butyral content expressed as polyvinyl butyral 80% by weight) | 1 |
| Carbon black pigment | 1 |
| Benzene/methanol solvent (50:50 mixture) | 94 |
| Total | 100 |

The above prepared finish composition 2 is dip coated on the microporous polyurethane sheet material as prepared in Example 1 and the finish is applied at about 6.0 oz./square yard. The finish is dried and a clear final coat of cellulose acetate butyrate is applied as in Example 1 and the material is then embossed using the same procedure as in Example 1. The resulting sheet material has an excellent leather-like appearance.

The resulting sheet material is subjected to the identical physical tests of Example 1 and the results of these tests are recorded in Table I. The test data show that the finish is flexible and abrasion resistant and that the solvent used to apply the finish did not degrade or adversely affect the appearance or the physical properties of the microporous sheet material.

EXAMPLE 3

Polyurethane Polymer C is prepared by reacting 1 mole of the bis-chloroformate of polytetramethyleneether glycol, molecular weight about 1000, 2 moles bis-chloroformate of 1,4-butanediol, 1 mole of adipyl chloride and 4.2 moles piperazine.

Finish Composition 3 is formed by blending the following ingredients:

| | Parts by weight |
|---|---|
| Polyurethane Polymer C | 5 |
| Carbon black pigment | 1 |
| Dichloroethane (solubility parameter between 9.1–10.7) | 94 |
| Total | 100 |

The above prepared finish composition 3 is dip coated on the microporous polyurethane sheet material as prepared in Example 1 applying about 6.0 oz./square yard. The finish is dried and a clear final coat of cellulose acetate butyrate is applied as in Example 1 and the material is then embossed using the same procedure as in Example 1. The resulting sheet material has an excellent leather-like appearance.

The resulting sheet material is subjected to the identical physical tests of Example 1 and the results of these tests are recorded in Table I. The test data show that the finish is flexible and abrasion resistant and that the solvent used to apply the finish did not degrade or adversely affect the appearance or the physical properties of the microporous sheet material.

EXAMPLE 4

Finish Composition 4 is formed by blending the following ingredients:

| | Parts by weight |
|---|---|
| Polyurethane Polymer C | 5 |
| Carbon black pigment | 1 |
| Benzyl alcohol | 94 |
| Total | 100 |

The above prepared finish composition 4 is dip coated on the microporous polyurethane sheet material as prepared in Example 1 applying about 6.0 oz./square yard. The finish is dried and a clear final coat of cellulose acetate butyrate is applied as in Example 1 and the material is then embossed using the same procedure as in Example 1. The resulting sheet material has an excellent leather-like appearance, good flexibility and is abrasion resistant.

EXAMPLE 5

Polyurethane polymer D is prepared for the coating composition by reacting 1 mole of the bis-chloroformate of polytetramethyleneether glycol, molecular weight 1000, 1.33 moles of bis-chloroformate 1,4-butanediol and 2.45 moles hexamethylenediamine.

Finish composition 5 is formed by blending the following ingredients:

| | Parts by weight |
|---|---|
| Polyurethane polymer D | 5 |
| Carbon black pigment | 1 |
| Methylene chloride/diethylene glycol ethyl ether (50:50 mixture) | 94 |
| Total | 100 |

The above prepared finish composition 5 is dip coated on the microporous polyurethane sheet material as prepared in Example 1 applying about 6.0 oz./square yard. The finish is dried and a clear final coat of cellulose acetate butyrate is applied as in Example 1 and the material is then embossed using the same procedure as in Example 1. The resulting sheet material has an excellent leather-like appearance.

The resulting sheet material is subjected to the identical physical tests of Example 1 and the results of these tests are recorded in Table I. The test data show that the finish is flexible and abrasion resistant and that the solvent used to supply the finish did not degrade or adversely affect the appearance or the physical properties of the microporous sheet material.

EXAMPLE 6

A finish composition 6 is formed by blending the following ingredients:

| | Parts by weight |
|---|---|
| Polyurethane polymer A (prepared as in Example 1) | 5 |
| Dow corning silicone C–4–2009—dimethyl polysiloxane having a viscosity of about 1200 centipoises | 0.05 |
| Carbon black pigment | 0.5 |
| Toluene/ethanol solvent mixture | 94.45 |
| Total | 100.00 |

The above prepared coating composition 6 is dip coated on the microporous polyurethane sheet material as prepared in Example 1 applying about 0.35 oz./square yard. The finish is dried and a clear final coat of cellulose acetate butyrate is applied as in Example 1 and the material is then embossed using the same procedure as in Example 1. The resulting sheet material has an excellent leather-like appearance.

The resulting sheet material is subjected to the identical physical tests of Example 1 and the results of these tests are recorded in Table I. The test data show that the solvent used to apply the finish did not degrade or adversely affect the appearance of the physical properties of the microporous sheet material.

EXAMPLE 7

A polyurethane finish composition 7 is prepared by blending the following ingredients:

| | Parts by weight |
|---|---|
| Polyurethane polymer A (prepared as in Example 1) | 4.40 |
| Polyvinyl butyral (described in Example 2) | 1.75 |
| Titanium dioxide pigment (rutile) | 7.50 |
| Toluene/isopropyl alcohol (50:50 mixture) | 86.35 |
| Total | 100.00 |

The above prepared finish composition 7 is dip coated on the microporous sheet material as prepared in Example 1 applying about 6.5 oz./square yard. The finish is dried at 100° C. and an acrylic dispersion is then sprayed on top of the dried polyurethane finish.

The acrylic dispersion is prepared by blending the following ingredients:

| | Parts by weight |
|---|---|
| Aqueous acrylic polymer dispersion (50% by weight polymer solids, the polymeric constituent is a blend of the following two polymers: (1) 70% by weight of a polymer of methyl methacrylate/ethyl acrylate/methacrylic acid, weight ratio 38/57/4, in which about 50% of the carboxyl groups have been reacted with propylenimine; (2) 30% by weight of a polymer of methyl methacrylate/ethyl acrylate, weight ratio 35/65) | 12.5 |
| Titanium dioxide pigment | 12.5 |
| Water | 75.0 |
| Total | 100.0 |

About 4.0 oz./square yard of the above acrylic dispersion is sprayed on the above prepared polyurethane finished microporous sheet and dried at 100° C. A clear final coat of cellulose acetate butyrate is applied as in Example 1 and the material is then embossed using the same procedure as in Example 1. The resulting sheet material has an excellent leather-like appearance.

The resulting sheet material is subjected to the identical physical tests of Example 1 and the results of these tests are recorded in Table I. The test data show that the finish is flexible and abrasion resistant and that the solvent used to apply the finish did not degrade or adversely affect the appearance or the physical properties of the microporous sheet material.

We claim:
1. A process for coating an organic film-forming finish composition on a fiber reinforced microporous chain-extended polyurethane sheet material which comprises:
Step (A) applying a layer of a finish composition on said sheet material, said finish composition comprising
  (a) 0.1–10% by weight of a polyurethane polymer consisting essentially of the reaction product of a bis-haloformate of a polyalkyleneether glycol having a molecular weight over 400 and a bis-haloformate of a glycol having a molecular weight below 400 with an organic diamine; and
  (b) 90–99.9% by weight of a solvent being substantially inert to said microporous sheet material and selected from the group consisting of
    (1) a mixture of an aromatic solvent and a hydroxyl terminated organic solvent from the group consisting of a $C_1$–$C_6$ saturated aliphatic monohydric alcohol and a glycol monoalkylether wherein the alkyl group is $C_1$–$C_4$;
    (2) an aralkyl alcohol; and
    (3) a halogenated organic liquid having a solubility parameter of 9.1–10.7;
and Step (B) drying the coated microporous sheet material to give a finish layer about 0.1–5 mils in thickness.

2. The process of claim 1 in which the finish composition has a polymer solids content of about 0.1–10% by weight and in which the polyurethane polymer of said finish composition consists essentially of the reaction product of a bis-chloroformate of poly(alkyleneether) glycol, the bis-chloroformate of $C_2$–$C_6$ glycol and a heterocyclic diamine and in which the chain-extended polyurethane polymer of said microporous sheet material comprises a chain-extended polyurethane polymer having a molecular weight of about 5000–300,000 which is formed by reacting an organic diisocyanate with an active hydrogen containing polymeric material selected from the group consisting of polyalkyleneether glycols and hydroxyl terminated polyesters to produce an isocyanate terminated polyurethane prepolymer which is chain-extended with a compound having at least two amino nitrogen atoms, each having at least one reactive hydrogen attached thereto.

3. The process of claim 2 in which the polyurethane polymer for the finish composition is the reaction product of the bis-chloroformate of poly(tetramethyleneether) glycol, the bis-chloroformate of butane diol and piperazine.

4. The process of claim 2 in which the polymeric component of the finish composition contains up to 50% by weight polyvinyl butyral and in which the solvent is a mixture of 30 to 70% by volume of an aromatic solvent and 70 to 30% by volume of an organic solvent from the group consisting of $C_1$–$C_4$ saturated aliphatic monohydric alcohol and a glycol monoalkylether wherein the alkyl group is $C_1$–$C_4$.

5. The process of claim 4 in which the solvent is a mixture consisting of toluene and ethanol.

TABLE I

| | | | | Evaluation of a Finished Microporous Polyurethane Sheet Material | | |
|---|---|---|---|---|---|---|
| Finish Compositions | Solvent System | Bally Flex. (40,000 Flexes) | Cold Cracking −20° F. | Permeability value (gr./hr./ 100 m.²) | Edgewear Wet | Dry |
| 1 | Toluene/ethanol | 1 | 0 | 2,800 | 0 | 2 |
| 2 | Benzene/methanol | 1 | 0 | 2,800 | 0 | 0 |
| 3 | Dichloroethane | 1 | 0 | 2,200 | 0 | 0 |
| 5 | Methylene chloride/diethylene glycol ethyl ether | 2 | 0 | 2,500 | 0 | 0 |
| 6 | Toluene/ethanol | 1 | 0 | 4,200 | 0 | 0 |
| 7 | Toluene/isopropanol | 0 | 0 | 3,200 | 0 | 0 |

Rating System:
 0=No cracks or abrasion.
 1=Microcracks or some visual abrasion.
 2=Some visual cracks plus microcracks or deep abrasion without coating failure.
 3=Severe visual cracks or complete failure of coating.

6. The process of claim 2 in which the solvent consists essentially of Ar—$(CH_2)_nOH$ in which Ar— is a monovalent aromatic radical and $n$ is from 1–4.

7. The process of claim 2 in which the solvent is a $C_1$–$C_6$ halogenated organic solvent having a solubility parameter of 9.1–10.7.

8. The process of claim 2 in which the finish composition contains 0.5–10% by weight, based on total polymer solids of said coating solution, of a silicone resin.

9. The process of claim 8 in which the silicone resin is dimethyl polysiloxane.

10. A process for coating an organic film-forming finish composition on a fiber reinforced microporous chain-extended polyurethane sheet material which comprises:
   Step (A) applying a layer of a finish composition on said sheet material, said finish composition having a polymer solids content of about 0.1–10% by weight of a polyurethane polymer consisting essentially of the reaction product of a bis-chloroformate of a poly(alkyleneether)glycol, the bis-chloroformate of a $C_2$–$C_6$ glycol and a hetrocyclic diamine; and a solvent being substantially inert to said microporous sheet material selected from the group consisting of
      (1) a mixture of an aromatic solvent and a hydroxyl terminated organic solvent from the group consisting of a $C_1$–$C_6$ saturated aliphatic monohydric alcohol and a glycol monoalkylether wherein the alkyl group is $C_1$–$C_4$;
      (2) an aralkyl alcohol; and
      (3) a halogenated organic liquid having a solubility parameter of 9.1–10.7;
   Step (B) drying the coated microporous sheet material; Step (C) applying a layer of an aqueous acrylic polymer dispersion over the dried polyurethane finish layer; and Step (D) drying the coated sheet material; said aqueous acrylic polymer dispersion having a pH of 7–10 and containing 10–50% by weight polymer solids, said acrylic polymer consisting essentially of 1–6% by weight of units of an $\alpha,\beta$-unsaturated monovinylidene carboxylic acid, units of methacrylic acid ester, and units of an acrylic acid ester, said esters being of a $C_1$–$C_{12}$ saturated aliphatic monohydric primary alcohol, said acrylic polymer having a tensile strength of at least 500 pounds per square inch and an elongation at break of at least 300%; wherein the chain-extended polyurethane polymer of said microporous sheet material comprises a chain-extended polyurethane polymer having a molecular weight of about 5000–300,000 which is formed by reacting an organic diisocyanate with an active hydrogen containing polymeric material selected from the group consisting of polyalkyleneether glycols and hydroxyl terminated polyesters to produce an isocyanate terminated polyurethane prepolymer which is chain-extended with a compound having at least two amino nitrogen atoms, each having at least one reactive hydrogen attached thereto.

11. The process of claim 10 in which the carboxyl groups of the acrylic polymer have been reacted with an alkylene imine of the formula

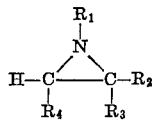

wherein $R_1$, $R_2$, $R_3$ and $R_4$ are individually selected from the group consisting of H and $C_1$–$C_5$ alkyl radicals forming a polymer having a nitrogen content of about 0.05–1% by weight.

12. A process for coating an organic film-forming finish composition on a fiber reinforced microporous chain-extended polyurethane sheet material which comprises: Step (A) applying a layer of a finish composition on said sheet material, said finish composition having a polymeric solids content of about 0.1–10% by weight in which the polymeric component of the finish consists essentially of the reaction product of a bis-chloroformatae of poly(alkyleneether)glycol, the bis-chloroformate of a $C_2$–$C_6$ glycol and heterocyclic diamine; and contains up to 50% by weight of polyvinyl butyral; and a solvent being substantially inert to said microporous sheet material which consists essentially of a mixture of 30–70% by volume of an aromatic solvent and 70–30% of an organic solvent selected from the group consisting of a $C_1$–$C_4$ saturated aliphatic monohydric alcohol and a glycol monoalkylether wherein the alkyl group is $C_1$–$C_4$; Step (B) drying the coated microporous sheet material; Step (C) applying a layer of an aqueous acrylic polymer dispersion over the polymeric finish layer; and Step (D) drying the coated sheet material, said aqueous acrylic polymer dispersion having a pH of 7–10 and containing 10–50% by weight polymer solids said acrylic polymer consisting of a blend of polymer of
   (1) 25–35% by weight of units of a polymer of 30–40% by weight of units of methyl methacrylate and 70–60% by weight of units of ethyl acrylate; and
   (2) 75–65% by weight of a polymer of 35–40% by weight of units of methyl methacrylate, 50–60% by weight of units of ethyl acrylate, 2–4% by weight of units of methacrylic acid wherein the polymer (2) has been reacted with sufficient propylenimine to provide a nitrogen content of 0.01–0.5% by weight; wherein the chain-extended polyurethane polymer of said microporous sheet material comprises a chain-extended polyurethane polymer having a molecular weight of about 5000–300,000 which is formed by reacting an organic diisocyanate with an active hydrogen containing polymeric material selected from the group consisting of polyalkyleneether glycols and hydroxyl terminated polyesters to produce an isocyanate terminated polyurethane prepolymer which is chain-extended with a compound having at least two amino nitrogen atoms, each having at least one reactive hydrogen attached thereto.

13. The process of claim 12 in which the polyurethane polymer of the microporous sheet material contains up to 50% by weight polyvinyl chloride.

14. A flexible permeable microporous polyurethane sheet material consisting essentially of a dried coalesced polyurethane finish layer superimposed and adhered to a microporous polyurethane substrate and having a dried coalesced layer of an acrylic polymer in superimposed adherence with said coalesced polyurethane finish layer; the polyurethane of said finish layer consists essentially of the reaction product of a bis-chloroformate of poly(alkyleneether)glycol, the bis-chloroformate of a $C_2$–$C_6$ glycol and a heterocyclic diamine; said acrylic polymer consisting essentially of a blend of polymer of
   (1) 25–35% by weight of a polymer of 30–40% by weight of units of methyl methacrylate and 70–60% by weight of units of ethyl acrylate; and
   (2) 75–65% by weight of a polymer of 35–40% by weight of units of methyl methacrylate, 50–60% by weight of units of ethyl acrylate, and 2–4% by weight of units of methacrylic acid wherein said polymer has been reacted with sufficient propylenimine to provide a nitrogen content of 0.01–0.5% by weight;
wherein the polymer of the microporus polyurethane substrate consists essentially of a chain-extended polyurethane polymer having a molecular weight of about 5000–300,000 which is formed by reacting an organic diisocyanate with an active hydrogen containing polymeric material selected from the group consisting of polyalkylene ether glycols and hydroxyl terminated polyesters to produce an isocyanate terminated polyurethane prepolymer which is chain-extended with a compound having at least two amino nitrogen atoms, each having at least one reactive hydrogen attached thereto.

15. The flexible permeable microporous sheet material of claim 14 having a dried coalesced coat of cellulose acetate butyrate in superimposed adherence with said acrylic polymer layer.

References Cited

UNITED STATES PATENTS

| | | | |
|---|---|---|---|
| 2,929,802 | 3/1960 | Katz | 260—77.5 |
| 2,962,470 | 11/1960 | Jung | 260—33.4 X |
| 2,987,494 | 6/1961 | Black | 117—161 X |
| 3,067,482 | 12/1962 | Hollowell | 117—63 X |
| 3,067,483 | 12/1962 | Hallowell | 117—140 X |
| 3,100,721 | 8/1963 | Holden | 117—135.5 |
| 3,211,580 | 10/1965 | Langmann et al. | 117—161 |
| 2,973,333 | 2/1961 | Katz et al. | 260—33.4 X |

WILLIAM D. MARTIN, Primary Examiner

T. G. DAVIS, Assistant Examiner

U.S. Cl. X.R.

117—11, 73, 138.8, 140, 161